United States Patent
Mizuno et al.

(10) Patent No.: US 8,171,806 B2
(45) Date of Patent: May 8, 2012

(54) FORCE DETECTION ELEMENT

(75) Inventors: Kentaro Mizuno, Nisshin (JP); Shoji Hashimoto, Seto (JP); Hiromichi Yasuda, Gotemba (JP); Hidenori Moriya, Susono (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 253 days.

(21) Appl. No.: 12/591,149

(22) Filed: Nov. 10, 2009

(65) Prior Publication Data

US 2010/0206092 A1   Aug. 19, 2010

(30) Foreign Application Priority Data

Nov. 11, 2008   (JP) ................................. 2008-289039

(51) Int. Cl.
  *G01L 1/22* (2006.01)
(52) U.S. Cl. ..................................... 73/862.474; 73/777
(58) Field of Classification Search .................... 73/760, 73/777, 862.474
  See application file for complete search history.

(56) References Cited

U.S. PATENT DOCUMENTS

| | | | | |
|---|---|---|---|---|
| 5,208,477 A | * | 5/1993 | Kub | 257/421 |
| 5,270,531 A | * | 12/1993 | Yonemoto | 250/208.1 |
| 5,349,873 A | | 9/1994 | Omura et al. | |
| 5,400,662 A | * | 3/1995 | Tamori | 73/862.046 |
| 5,668,579 A | * | 9/1997 | Fujii et al. | 347/10 |
| 5,773,728 A | | 6/1998 | Tsukada et al. | |
| 5,789,779 A | * | 8/1998 | Arai et al. | 257/341 |
| 6,576,958 B2 | * | 6/2003 | Ker et al. | 257/355 |
| 6,915,702 B2 | | 7/2005 | Omura et al. | |
| 7,410,859 B1 | * | 8/2008 | Peidous et al. | 438/231 |
| 2003/0101828 A1 | | 6/2003 | Omura et al. | |
| 2004/0055390 A1 | | 3/2004 | Hashimoto et al. | |
| 2007/0240518 A1 | | 10/2007 | Mizuno et al. | |
| 2007/0254387 A1 | | 11/2007 | Hakomori et al. | |
| 2010/0065933 A1 | | 3/2010 | Hakomori et al. | |

FOREIGN PATENT DOCUMENTS

| | | |
|---|---|---|
| JP | A-2-205077 | 8/1990 |
| JP | A-3-37534 | 2/1991 |
| JP | A-6-34455 | 2/1994 |
| JP | A-8-181331 | 7/1996 |
| JP | A-8-193901 | 7/1996 |
| JP | A-8-271363 | 10/1996 |
| JP | A-2003-222560 | 8/2003 |
| JP | A-2004-3890 | 1/2004 |
| JP | A-2004-132812 | 4/2004 |
| JP | A-2004-191279 | 7/2004 |
| JP | A-2007-263667 | 10/2007 |
| JP | A-2007-324566 | 12/2007 |

OTHER PUBLICATIONS

Japanese Office Action dated Dec. 21, 2010 in corresponding Japanese Patent Application No. 2008-289039 (with translation).

* cited by examiner

*Primary Examiner* — Max Noori
(74) *Attorney, Agent, or Firm* — Oliff & Berridge, PLC

(57) ABSTRACT

A temperature compensated force detection element is provided with a substrate, an insulation layer disposed above the substrate, and a p-type semiconductor layer disposed above the insulation layer, and a positive electrode and a negative electrode disposed apart from each other above the p-type semiconductor layer. A gauge portion being electrically connected to the positive electrode and having a higher impurity concentration than the p-type semiconductor layer, and an n-type region electrically connected to the negative electrode are formed in the p-type semiconductor layer.

6 Claims, 6 Drawing Sheets

FORCE DETECTION ELEMENT

CROSS-REFERENCE TO RELATED APPLICATION

This application claims priority to Japanese Patent Application No. 2008-289039, filed on Nov. 11, 2008, the contents of which are hereby incorporated by reference into the present application.

TECHNICAL FIELD

The present invention relates to a force detection element having a gauge portion.

DESCRIPTION OF RELATED ART

A resistance of a gauge portion having a piezo-resistive effect varies in accordance with a force applied to the gauge portion. By utilizing this phenomenon, a force detection element for detecting the force applied to the gauge portion is being developed. This type of gauge portion is also known to change its resistance in accordance with an environmental temperature change in addition to the change of its resistance due to the force applied to the gauge portion. Japanese Patent Application Publication Nos. 08-181331A and 2007-263667A propose a technique to serially connect a diode to the gauge portion in order to compensate for an effect of the environmental temperature change. The diode has a temperature coefficient of resistance (TCR) having an opposite polarity (positive/negative) from the gauge portion's TCR. Hence, the TCR of the gauge portion is cancelled by the TCR of the diode, and the total TCR of the gauge portion and the diode is adjusted to be small.

SUMMARY

As described in the aforesaid Japanese Patent Application Publication No. 08-181331A, the gauge portion is typically materialized by introducing p-type impurities to a surface portion of an n-type semiconductor layer. The diode for temperature compensation includes an n-type semiconductor region adjacent to the p-type gauge portion, and the p-type gauge portion and the n-type semiconductor region compose the diode for temperature compensation. However, when the p-type gauge portion is formed in the surface portion of the n-type semiconductor layer, this structure composes a parasitic diode between the n-type semiconductor layer and the p-type gauge portion. When the environmental temperature becomes high, a problem in which a leak current flows through this parasitic diode may occur. Even if the diode for temperature compensation is provided, if no measure is taken with respect to the parasitic diode, an accurate detection of force may be disturbed by the environmental temperature change. The present teachings disclosed herein aim to suppress the leak current due to parasitic diode and provide a temperature-compensated force detection element.

The force detection element disclosed herein comprises a substrate; an insulation layer disposed above the substrate; a p-type semiconductor layer disposed above the insulation layer; and a first and a second electrodes disposed above the semiconductor layer. The first and second electrodes are arranged apart from each other. The force detection element disclosed herein also comprises a gauge portion and an n-type region both formed in the p-type semiconductor layer. The gauge portion is electrically connected to the first electrode and has a higher p-type impurity concentration than the p-type semiconductor layer. The n-type region is electrically connected to the second electrode.

The force detection element disclosed herein is characterized in having a p-type semiconductor layer. By forming a gauge portion having a condensed p-type impurity density within the less-condensed p-type semiconductor layer, the aforesaid parasitic diode is not formed between the semiconductor layer and the gauge portion. The leak current due to the parasitic diode is thus suppressed. Furthermore, the force detection element disclosed herein includes a stack-layered substrate in which the substrate, the insulation layer, and the semiconductor layer are sequentially stacked. If, to the contrary, the stack-layered substrate is not used and the gauge portion is formed in the p-type semiconductor substrate, a resistance of the p-type semiconductor substrate other than the gauge portion becomes small due to the thickness of the p-type semiconductor substrate being large. This brings about a problem of decrease in the current flowing through the gauge portion and of deterioration in detection accuracy. However, when the stack-layered substrate is used, the resistance of the p-type semiconductor layer other than the gauge portion can be made large because the thickness of the p-type semiconductor layer can be made less; and as such, the current flowing through the p-type semiconductor layer can substantially be deduced. That is, the substantial portion of current between the first and second electrodes flows through the gauge portion.

According to the teachings disclosed herein, a force detection element having a temperature compensation and excellent detection accuracy is materialized by the usage of the p-type semiconductor layer and the stack-layered substrate.

According to the teachings disclosed herein, the leak current due to a parasitic diode can be suppressed. A temperature-compensated force detection element can be provided.

DETAILED DESCRIPTION OF THE INVENTION

Figure 1:
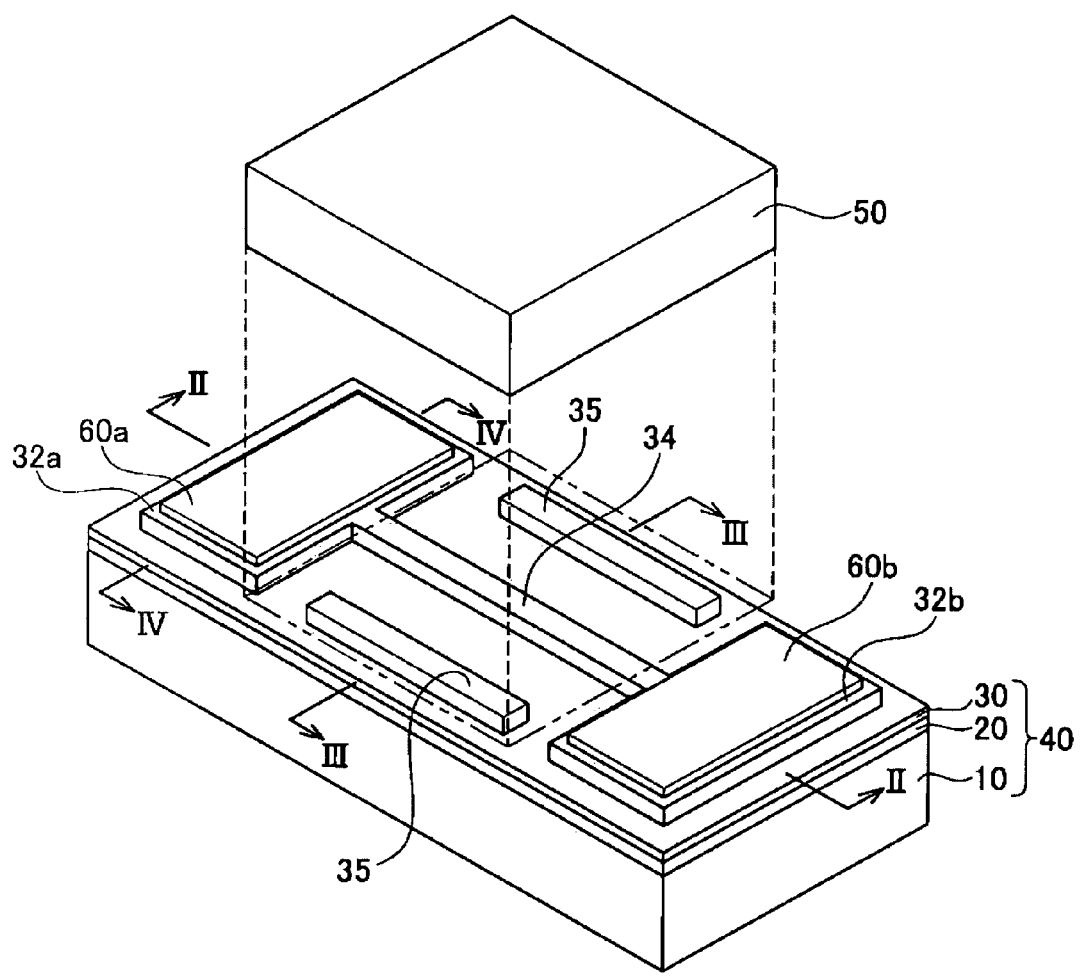
FIG. 1 shows schematically an exploded perspective view of a force detection element of a first embodiment.

A force detection element may comprise a substrate; an insulation layer disposed above the substrate; a semiconductor layer disposed above the insulation layer; a first electrode disposed above a first region of a top surface of the semiconductor layer; and a second electrode disposed above a second region of the top surface of the semiconductor layer. The first region may be arranged apart from the second region. The semiconductor layer may include a p-type gauge portion, an n-type region and a p-type region. The p-type gauge portion may be electrically connected to the first electrode via the first region and may have a higher p-type impurity concentration than the p-type region. The n-type region may be electrically connected to the second electrode via the second region. The p-type region may surround the p-type gauge portion and the n-type region. The p-type gauge portion and the n-type region may be connected in series between the first region and the second region.

It is preferable that the semiconductor layer is a p-type semiconductor layer. In this case, the p-type gauge portion and the n-type region may be formed in the p-type semiconductor layer by utilizing an ion-implantation technique, so that the p-type gauge portion and the n-type region are dopant ions diffusion regions, and the p-type region is a region that dopant ions are not substantively diffused by the ion-implantation technique.

It is preferable that the p-type semiconductor layer includes a protruding portion extending in a direction along which the first electrode and the second electrode align. Moreover, the gauge portion may preferably be formed within the protruding portion. By configuring the gauge portion to be in a protruded form, the detection sensitivity can be improved.

It is preferable that the p-type semiconductor layer includes a thick portion and a thin portion. Moreover, the protruding portion may be formed with the thick portion.

The aforesaid semiconductor layer may be produced according to a process as below. First, a stack-layered substrate having a semiconductor layer whose thickness is thicker than a predetermined thickness that is required for configuring the protruding portion may be prepared. At least a part of the semiconductor layer is etched from its surface to a predetermined depth so that the thick portion and the thin portion are formed. If, in the aforesaid process, the semiconductor layer is etched to penetrate therethrough and thereby only form a gauge portion in a form of a wall, the height of the gauge portion may vary in accordance with the variation in the thickness of the semiconductor layer. To the contrary, according to the teachings disclosed herein, by etching from the surface of the semiconductor layer to the standardized predetermined depth, the height of the protruding portion can be standardized regardless of the variation in the thickness of the semiconductor layer. Force detection elements having a standardized detection characteristic can thereby be mass-produced.

Other preferred features for the force detection element of the present teachings will be listed below.

(1) The impurity density of the p-type semiconductor layer is preferably equal to or less than $1 \times 10^{17}$ cm$^{-3}$.

(2) The impurity density of the gauge portion is preferably between $1 \times 10^{18}$ cm$^{-3}$ and $5 \times 10^{18}$ cm$^{-3}$, or between $1 \times 10^{20}$ cm$^{-3}$ and $5 \times 10^{20}$ cm$^{-3}$.

(3) The thickness of the p-type semiconductor layer is preferably 1-5 um.

(4) The first electrode is preferably connected to a constant current generation circuit.

(5) The gauge portion and the n-type region are preferably in contact in the direction along which the first and second electrodes align.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved force detection elements, as well as methods for manufacturing the same.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Figure 2:
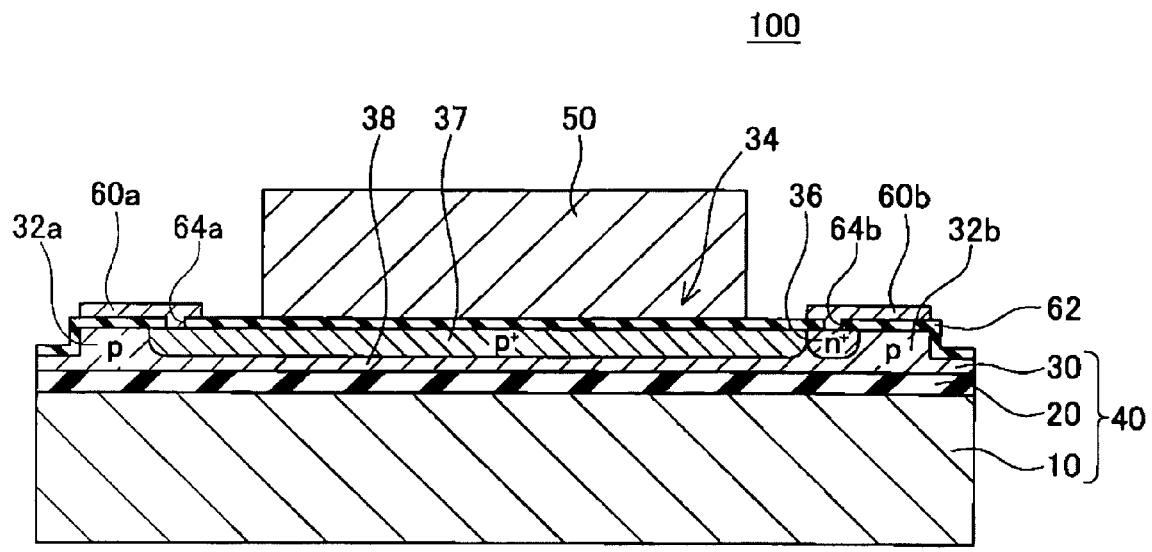
FIG. 2 shows a schematic cross-sectional view along line II-II of FIG. 1.
Figure 3:
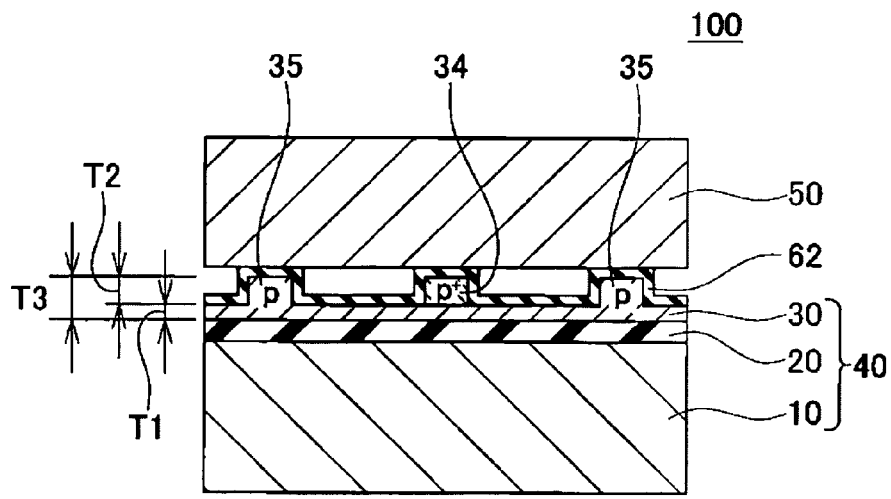
FIG. 3 shows a schematic cross-sectional view along line III-III of FIG. 1.
Figure 4:
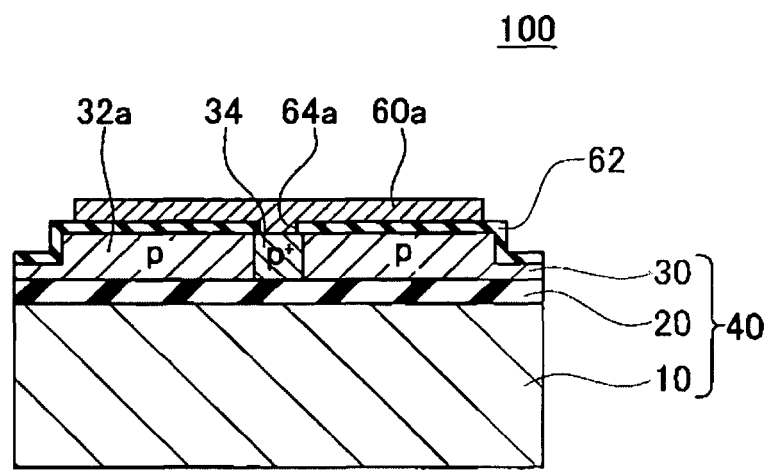
FIG. 4 shows a schematic cross-sectional view along line IV-IV of FIG. 1.

As referring to FIGS. 1-5, the first embodiment will be described below. Please note that, as shown in FIGS. 2-4, although a thin insulating protection film 62 is disposed above a stack-layered substrate 40, the insulating protection film 62 is abbreviated from the exploded perspective view of FIG. 1 for the sake of depictive simplicity. Note that this insulating protection film 62 may be excluded from the element as needed.

As shown in FIG. 1, the force detection element 100 comprises the stack-layered substrate 40 and a force transmission block 50. The stack-layered substrate 40 includes a silicon substrate 10, an insulation layer 20, and a device layer 30 (which is an example of a semiconductor layer). An SOI (Silicon On Insulator) substrate is used for the stack-layered substrate 40. The silicon substrate 10 is formed of a single-crystal silicon (Si) including either p-type or n-type impurities. The insulation layer 20 is disposed on a surface of the silicon substrate 10, and is formed of silicon oxide ($SiO_2$). The device layer 30 is disposed on a surface of the insulation layer 20, and is formed of a single-crystal silicon including the p-type impurities.

As shown in FIG. 1, a surface portion of the device layer 30 has been processed by an etching technique. The device layer 30 includes a pair of electrode portions 32a and 32b, a protruding portion 34 extending between the pair of electrode portions 32a, 32b, and a pair of pedestal portions 35 that is each arranged on the respective side of the protruding portion 34. The pair of electrode portions 32a, 32b, the protruding portion 34, and the pair of pedestal portions 35 are formed by etching a part of the device layer 30 from its surface to a predetermined depth. As shown in FIG. 3, the device layer 30 has a thickness T3 prior to the etching process. By etching the part of the device layer 30 to the predetermined depth T2, the protruding portion 34, the pair of pedestal portions 35 (as well as the pair of electrode portions 32a, 32b; cf. FIGS. 2 and 4) are thereby formed. Since the predetermined depth T2 is determined to be smaller than the thickness T3, a thin portion having a thickness T1 remains in the device layer 30 after the etching process. A part of the device layer 30 left remaining at a bottom part of the etched section thereof is herein referred to as a "thin portion", and a part of the device layer 30 that had not been etched is herein referred to as a "thick portion". The thickness T3 of the device layer 30 is preferably within a range of 1-5 um. The predetermined depth T2 is preferably within a range of 1-3 um. It is preferable that the predetermined depth T2 is larger than the thickness T1 so that the thickness T1 is thin enough to reduce a resistance of the device layer 30 (as will hereinafter be described in detail). The combination of the thickness T3 and the predetermined depth T2 within the aforesaid ranges is preferably determined such that the etching does not penetrate through the device layer 30.

Each of the pair of electrode portions 32a, 32b has a rectangular shape in a plan view, and the electrode portions 32a, 32b are arranged apart at a distance from each other. A positive electrode 60a made of aluminum (which is an example of a "first electrode") is disposed on a surface of the electrode portion 32a (hereinafter referred to as a "positive electrode portion 32a"). A negative electrode 60b made of aluminum (which is an example of a "second electrode") is disposed on a surface of the electrode portion 32b (hereinafter referred to as a "negative electrode portion 32b").

The protruding portion 34 has one end connected to the positive electrode portion 32a and another end connected to the negative electrode portion 32b. The protruding portion 34 has a mesa shape, and extends straightly between the positive electrode portion 32a and the negative electrode portion 32b.

As shown in FIG. 2, the protruding portion 34 includes a $p^+$-type gauge portion 37 formed therewithin. The gauge portion 37 is formed in a surface portion of the protruding portion 34 by using an ion-injection technique, and its impurity concentration is higher than the rest of the device layer 30. The impurity density of the gauge portion 37 is preferably between $1 \times 10^{18}$ cm$^{-3}$ and $5 \times 10^{18}$ cm$^{-3}$, or between $1 \times 10^{20}$ cm$^{-3}$ and $5 \times 10^{20}$ cm$^{-3}$. The gauge portion 37 extends along the protruding portion 34 between the positive electrode portion 32a and the negative electrode portion 32b. One end (first end) of the gauge portion 37 is electrically connected to the positive electrode 60a via a positive contact hole 64a formed in the insulating protection film 62. In the negative electrode portion 32b, an n-type region 36 including n-type impurities is formed. The n-type region 36 is formed in a surface portion of the negative electrode portion 32b by using an ion-injection technique. The n-type region 36 is directly adjacent to a side surface of another end (second end) of the gauge portion 37 (which is a surface facing towards a direction along which the positive electrode portion 32 and the negative electrode portion 32b align). The n-type region 36 is electrically connected to the negative electrode 60b via a negative contact hole 64b. The gauge portion 37 and the n-type region 36 may, as an alternative to the configuration of being directly adjacent to each other as in FIG. 2, be arranged apart from each other at a predetermined distance. Alternately, a part or a whole of the n-type region 36 may be configured to be surrounded by the gauge portion 37.

As shown in FIG. 1, the pair of pedestal portions 35 each has the mesa shape, and extends in a longitudinal direction of the protruding portion 34 but does not connect with the electrode portions 32a, 32b in the aforesaid direction. The force transmission block 50 is arranged to cover the protruding portion 34 and the pair of pedestal portions 35. The edges of the force transmission block 50 extend over pedestal portions 35 in a perpendicular direction with respect to the aforesaid direction. The force transmission block 50 is fixed to be parallel with the surface of the semiconductor layer 30 above the stack-layered substrate 40.

Figure 5:
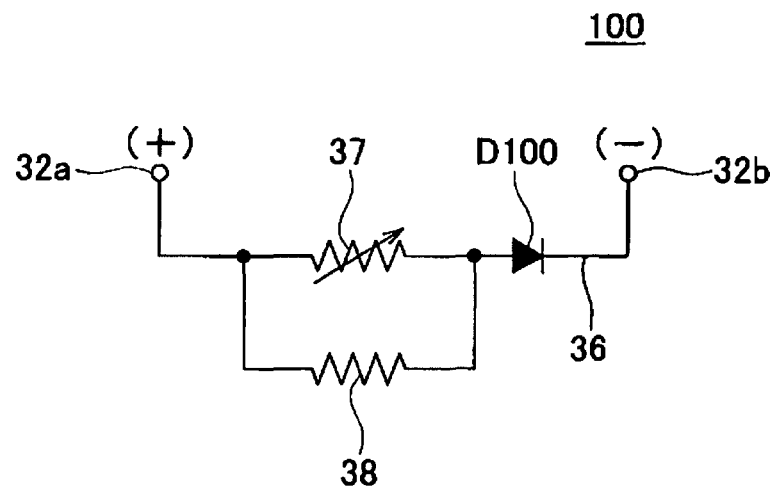
FIG. 5 shows an equivalent circuit diagram of the force detection element of the first embodiment.

As shown in FIG. 5, since the negative electrode 60b is connected to, e.g., an earth voltage, the negative electrode portion 32b is also connected to the earth voltage. Furthermore, since the positive electrode 60a is connected to, e.g., a constant current source such as a constant current generation circuit, the positive electrode 32a is also connected to the constant current generation circuit. A temperature compensation diode D100 is arranged between the p-type gauge portion 37 and the n-type region 36. The temperature compensation diode D100 is connected in series with the gauge portion 37 between the positive electrode 60a and the negative electrode 60b. The temperature compensation diode D100 has a negative temperature coefficient of resistance (TCR). On the other hand, the gauge portion 37 has a positive TCR. As such, the positive TCR of the gauge portion 37 is cancelled by the negative TCR of the temperature compensation diode D100, and the total TCR of the gauge portion 37 and the temperature compensation diode D100 is adjusted to be small.

The operation of the force detection element 100 will now be described. When an external force is applied to the force transmission block 50, the force is transmitted to the gauge portion 37 via the force transmission block 50 thereby to cause internal stress within the gauge portion 37, which results in the resistance of the gauge portion 37 to change. Since the positive electrode 60a is connected to the constant current generation circuit, a voltage difference between the positive electrode 60a and the negative electrode 60b changes in accordance with the aforesaid change in the resistance value of the gauge portion 37. The changing amount of the voltage is measured by a voltage measurement circuit, and the force that had been applied to the force transmission block 50 can be calculated therefrom.

The force detection element 100 is characteristic in that the device layer 30 is of the p-type. Furthermore, the $p^+$-type gauge portion 37 is formed within the p-type device layer 30. For example, when a $p^+$-type gauge portion is formed within an n-type device layer, a parasitic diode is formed between the n-type device layer and the $p^+$-type gauge portion. Such a parasitic diode increases current leak when the environmental temperature is increased. However, when the $p^+$-type gauge portion is formed within the p-type device layer 30 as in the force detection element 100 of the embodiment, the parasitic diode is not formed between the $p^+$-type gauge portion 37 and the p-type device layer 30. Hence, by using the diode D100 for temperature compensation and the p-type device layer 30 in combination, a force detection element 100 that has excellent characteristic of temperature compensation can be achieved. In order for the resistance of the p-type device layer 30 to be large, the impurity concentration of the device layer 30 is preferably equal to or less than $1 \times 10^{17}$ cm$^{-3}$.

Moreover, the force detection element 100 is characteristic in that it utilizes the stack-layered substrate 40 in which the silicon substrate 10, the insulation layer 20, and the device layer 30 are sequentially stacked. When the stack layered substrate 40 is used, the layer thickness of the p-type device layer 30 can be made thinner. Hence, the parasitic resistance of the p-type device layer 30 becomes larger, to a degree in which the current flowing via the parasitic resistance can substantially be ignored. The current between the positive electrode 60a and the negative electrode 60b as a result substantially flows through the gauge portion 37. According to this configuration, an excellent characteristic of detection accuracy can be achieved.

The force detection element 100 may further comprise the below features.

(1) As shown in FIG. 3, the device layer 30 includes one or more thick portions having thickness T3, and one or more thin portions having thickness of T1. The protruding portion 34 and the pair of pedestal portions 35 are formed in the respective thick portion. The device layer 30 having this configuration is characteristic in being formed by an etching of depth T2. Specifically, the stack-layered substrate 40 including the device layer 30 whose thickness T3 is thicker than a predetermined height T2 that is required for the protruding portion 34 may be prepared. One or more parts of the device layer 30 is then etched from its surface to the predetermined depth T2 so that the thick portion and the thin portion are formed. Typically, the thickness of the device layer 30 of the SOI substrate publicly sold tends to vary even if the substrate complies under one of the standardizations. Thus, if the device layer 30 is etched to penetrate therethrough and thereby form the gauge portion in the form of a wall, the height of the gauge portion may vary in accordance with the variation in the thickness of the device layer 30. If the height of the gauge portion 37 includes a variation, a difference will occur in the internal stress occurring within the gauge portion even if the external force that effects the gauge portion is even. Since the resistance of the gauge portion may change in accordance with the internal stress occurring therein, such variation in the internal stress results in an undesirable variation of the detection characteristic for the respective force detection element. According to the present embodiment, even if the thickness of the device layer 30 has variation, the height of the protruding portion 34 can be standardized by performing the etching from the surface to the predetermined depth T2. Force detection elements 100 having a standardized detection characteristic can thereby be mass-produced.

(2) As shown in FIG. 2, a diffusion depth of the gauge portion 37 does not reach the insulation layer 20. Hence, in a lower side of the gauge portion 37, a bottom portion region 38 having a low impurity concentration is formed. However, the present teachings are not limited to such configuration. Preferably, the gauge portion 37 may be formed to reach the insulation layer 20. As mentioned above, the thickness of the device layer 30, even for the standardized, publicly sold SOI substrates, has variations. As such, when the gauge portion 37 having the desired diffusion depth is formed, the bottom portion region 38 may consequently be formed. As stated above, since the impurity density of the bottom portion region 38 is much lower than the gauge portion 37, the parasitic resistance of the bottom portion region 38 is sufficiently large. Hence, the current between the positive electrode 60a and the negative electrode 60b substantially flows through the gauge portion 37. The characteristic of having fine detection accuracy can thereby be achieved.

Second Embodiment

A force detection element 200 will now be described referring to FIGS. 6-9. The components identical to the force detection element 100 of the first embodiment will have the same reference number as the force detection element 100, and the detailed explanations thereof may be omitted.

Figure 6:
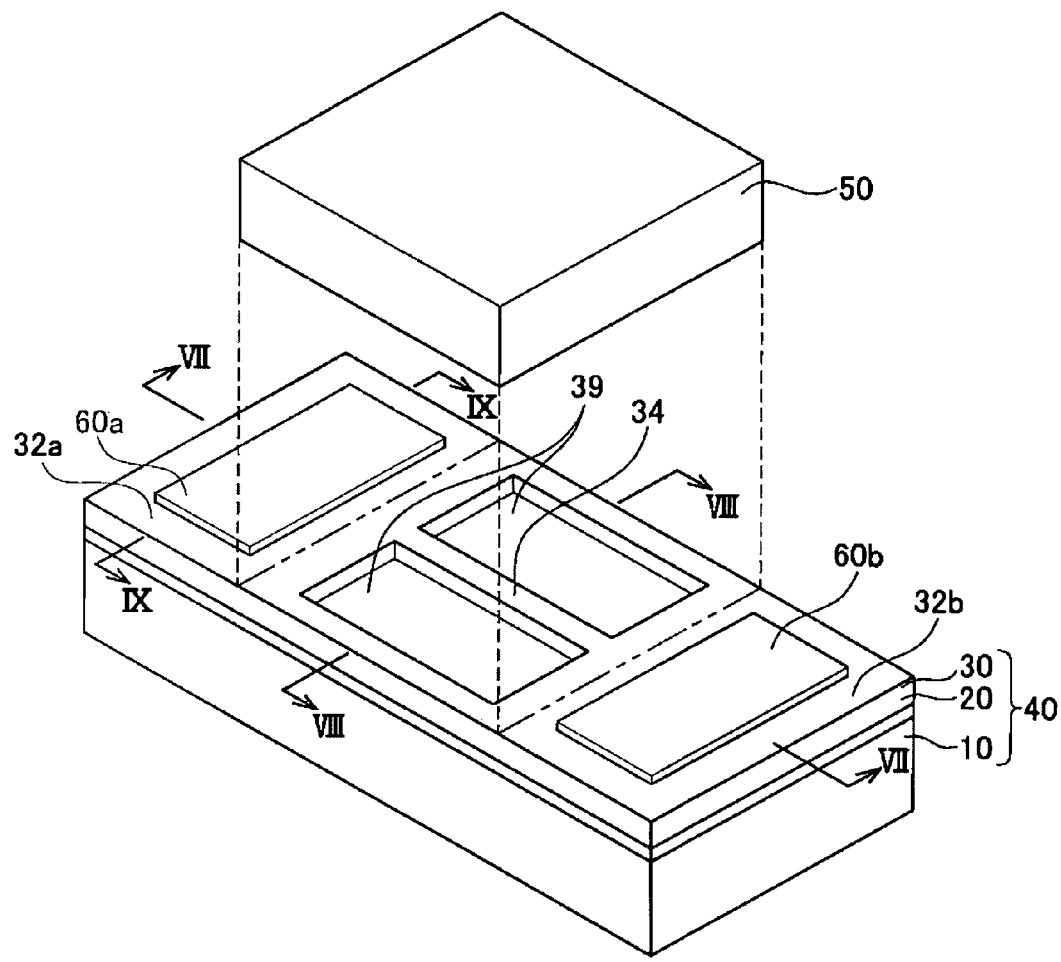
FIG. 6 shows schematically an exploded perspective view of a force detection element of a second element.
Figure 7:
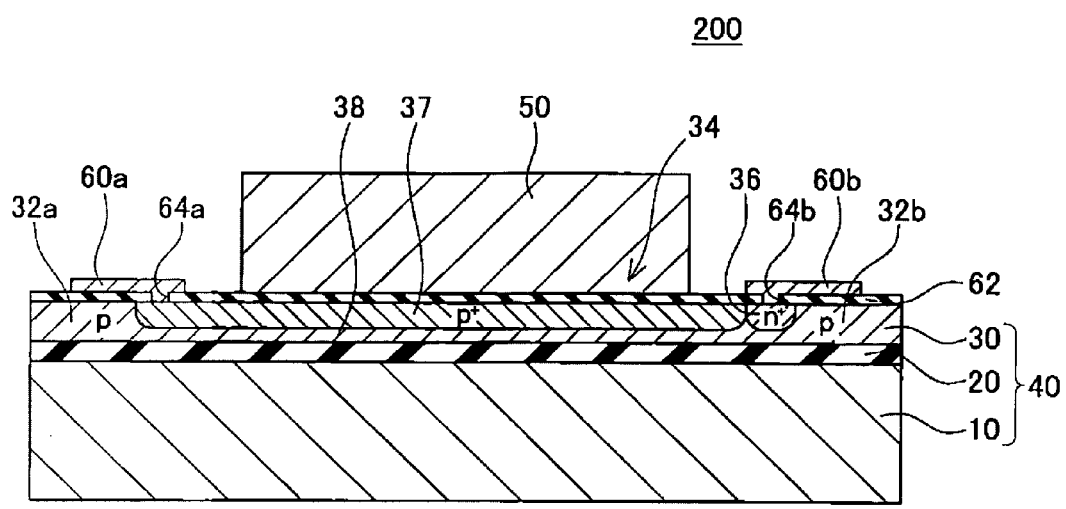
FIG. 7 shows a schematic cross-sectional view along line VII-VII of FIG. 6.
Figure 8:
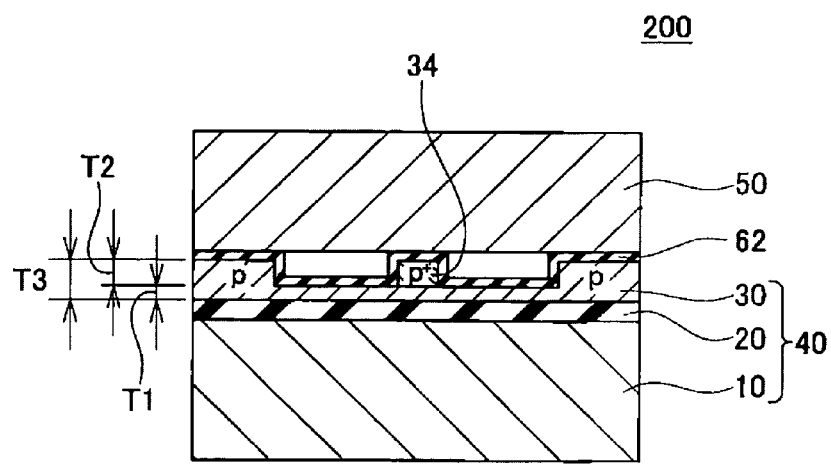
FIG. 8 shows a schematic cross-sectional view along line VIII-VIII of FIG. 6.
Figure 9:
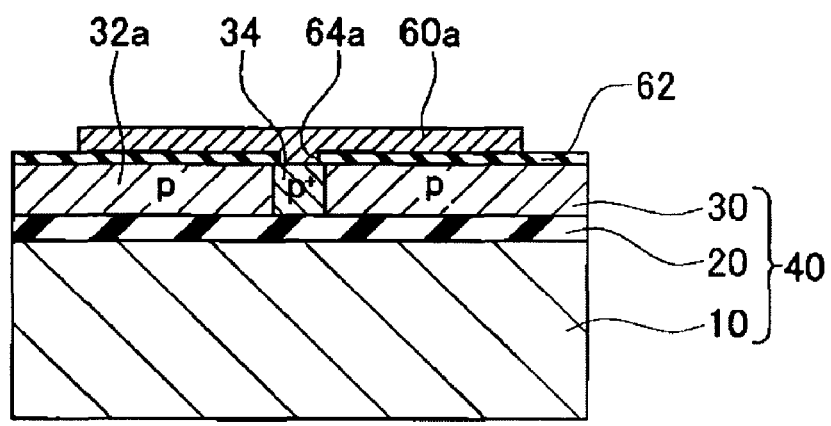
FIG. 9 shows a schematic cross-sectional view along line IX-IX of FIG. 6.

As shown in FIG. 6, the force detection element 200 comprises a pair of grooves 39 at the surface portion of the device layer 30. Each of the grooves 39 is surrounded by a part of the device layer 30 framing therearound. The protruding portion 34 materialized between the grooves 39. In the force detection element 200, the force transmission block 50 encloses the protruding portion 34. Furthermore, the force transmission block 50 covers the pair of grooves 39. This configuration enables the force detection element 200 to transfer force from the force transmission block 50 to the protruding portion 34 more easily. That is, the force detection element 200 has a characteristic of improved detection sensitivity.

The invention claimed is:
1. A force detection element comprising:
a substrate;
an insulation layer disposed above the substrate;
a p-type semiconductor layer disposed above the insulation layer including a protruding portion extending in a direction along which a first electrode and a second electrode align;
the first electrode disposed above the p-type semiconductor layer;
the second electrode disposed above the p-type semiconductor layer, the second electrode being arranged apart from the first electrode;
a gauge portion formed within the protruding portion of the p-type semiconductor layer, the gauge portion being electrically connected to the first electrode and having a higher p-type impurity concentration than the p-type semiconductor layer; and
an n-type region formed in the p-type semiconductor layer, the n-type region being electrically connected to the second electrode.
2. The force detection element as in claim 1, wherein the p-type semiconductor layer includes a thick portion and a thin portion, and the protruding portion is formed with the thick portion.
3. The force detection element as in claim 1, further comprising:
a force transmission block, and
a pair of pedestal portions, each of the pedestal portions being arranged on a respective side of the protruding portion, wherein the force transmission block is disposed above the protruding portion and the pair of pedestal portions.
4. The force detection element as in claim 3, wherein each of the pedestal portions extends in the direction along which the first electrode and the second electrode align.
5. The force detection element as in claim 1, further comprising:
a force transmission block, and
a pair of grooves formed in a surface portion of the p-type semiconductor layer, each of the grooves being arranged on a respective side of the protruding portion, wherein the force transmission block is disposed above the protruding portion.
6. The force detection element as in claim 5, wherein the force transmission block covers the pair of grooves.

* * * * *